(12) United States Patent
Jiang et al.

(10) Patent No.: US 7,846,260 B2
(45) Date of Patent: Dec. 7, 2010

(54) ON-LINE AUTOMATIC CLEANING DEVICE FOR A CONDENSER IN A TURBINE GENERATOR

(75) Inventors: Congquan Jiang, Room 2503 No. 2 Builing. Wu Ding Road, Shanghai (CN) 200043; Xinfu Ye, Shanghai (CN)

(73) Assignee: Congquan Jiang, Shanghai (CN)

( * ) Notice: Subject to any disclaimer, the term of this patent is extended or adjusted under 35 U.S.C. 154(b) by 448 days.

(21) Appl. No.: 11/912,911

(22) PCT Filed: Apr. 29, 2006

(86) PCT No.: PCT/CN2006/000879

§ 371 (c)(1),
(2), (4) Date: Oct. 29, 2007

(87) PCT Pub. No.: WO2006/116945

PCT Pub. Date: Nov. 9, 2006

(65) Prior Publication Data

US 2008/0185126 A1    Aug. 7, 2008

(30) Foreign Application Priority Data

Apr. 30, 2005    (CN) .................. 2005 1 0025638

(51) Int. Cl.
*B08B 3/02* (2006.01)
(52) U.S. Cl. .................. 134/18; 134/24; 134/113; 134/167 R
(58) Field of Classification Search ............. 134/166 R, 134/168 R, 172; 122/391, 392, 390, 405
See application file for complete search history.

(56) References Cited

U.S. PATENT DOCUMENTS 2,823,947 A * 2/1958 Delzer .................. 294/88
3,575,301 A * 4/1971 Panissidi ................ 414/618

(Continued)

FOREIGN PATENT DOCUMENTS

EP    0803697 A    10/1997

(Continued)

OTHER PUBLICATIONS

European Patent Office 0 472 378 Feb. 1992.*

(Continued)

*Primary Examiner*—Frankie L Stinson
(74) *Attorney, Agent, or Firm*—Lucas & Mercanti, LLP

(57) ABSTRACT

A device and method to perform on-line automatic flushing and cleaning for a steam turbine generator condenser, related with technology for flushing and cleaning of equipment during steam turbine generator operation, the apparatus includes: a polar coordinate traveling mechanical system, including one computer program polar coordinate control unit, which will control the servo motors to position the high-pressure water jet on the opening for Copper tube (or Titanium tube); the benefit for the invention is that, the polar coordinate traveling mechanical system move the high-pressure water jet to flush and clean each Copper tube (or Titanium tube) on condenser tube plate, to realize high-pressure water cleaning for each pipe during operation of generator, therefore, the heat exchanging efficient can be increased, further to reduce the consumption of coal for steam turbine generator, and archive the aim to saving coal, and reduction in generating cost.

12 Claims, 2 Drawing Sheets

U.S. PATENT DOCUMENTS

| | | | | |
|---|---|---|---|---|
| 3,934,731 | A | * | 1/1976 | Muller et al. ............ 414/749.1 |
| 4,188,167 | A | * | 2/1980 | Abell ...................... 414/744.6 |
| 4,428,417 | A | * | 1/1984 | Chesner ........................ 165/5 |
| 4,438,805 | A | * | 3/1984 | Gugel ....................... 165/11.2 |
| 4,501,522 | A | * | 2/1985 | Causer et al. .................. 414/4 |
| 4,503,506 | A | * | 3/1985 | Sturges, Jr. ................ 700/259 |
| 4,750,547 | A | * | 6/1988 | Sakamoto ................... 165/84 |
| 5,109,915 | A | * | 5/1992 | Osusko ...................... 165/11.2 |
| 5,238,502 | A | * | 8/1993 | Jenkins .................... 134/22.11 |
| 5,265,667 | A | * | 11/1993 | Lester et al. ............... 165/11.2 |
| 5,348,234 | A | * | 9/1994 | Woude ....................... 239/753 |
| 5,838,882 | A | * | 11/1998 | Gan et al. ................... 700/259 |
| 6,105,539 | A | * | 8/2000 | Ware et al. ................. 122/382 |
| 6,278,903 | B1 | | 8/2001 | Iwasaki et al. |
| 6,681,839 | B1 | | 1/2004 | Balzer |

FOREIGN PATENT DOCUMENTS

| | | | |
|---|---|---|---|
| EP | 0967452 A | | 12/1999 |
| FR | 2 691 385 | * | 11/1993 |

OTHER PUBLICATIONS

Fan, Shaosheng, et al. "Automatic Cleansing System for Steam Condenser Cooling Copper Tube" Coal Mine Automation, vol. 3, pp. 9-12, Published in Mar. 1999.

Fan, Shaosheng et al: "Automatic Cleaning System for Steam Condenser Cooling Copper Tube", Coal Mine Automation, No. 3 1999 published in Mar. 1999.

* cited by examiner

ON-LINE AUTOMATIC CLEANING DEVICE FOR A CONDENSER IN A TURBINE GENERATOR

TECHNICAL FIELD

This invention is related with power generator, especially on-line flushing and cleaning technology and apparatus used in running Steam Turbine Generator condenser, and also heat exchanger.

BACKGROUND OF THE INVENTION

Steam condenser, is steam/water heat exchanger, working as the most important auxiliary equipment for steam turbine generator. The heat exchange efficiency for the condenser is directly related with the efficiency of turbine generator, indicated by unit consumption for power generating process, or unit coal consumption for power generating process. The most significant impact factor for the condenser efficiency is the contamination inside the condenser. Usually, cooling water for power plant is river water or sea water, and silt and miscellaneous contamination existing in water will accumulate in water pass. Efficiency for condenser will be decreased due to such contamination, and get worse and worse with further operation. Therefore, as major energy saving measurement, the cleaning operation in condenser is very important for power plant.

Currently, there are two methods to clean condenser. First method is to clean the condenser after shutdown, tube will be cleaned one by one manually or by high pressure water, and this method has a certain advantage, after manual cleaning, the condenser can be cleaned as new set, while the disadvantage is, prior to open the top cover of condenser for flushing and cleaning, either the turbine generator or one part of condenser has to be shutdown; second method is on-line cleaning, with help from recycle water pressure, rubber particles will be sent into Copper tube (or Titanium tube) in condenser, to take any silt attached on pipe wall away; the disadvantage for this method is that, it is difficult to find the desired size and material for rubber particles, and also water pressures to meet the design requirement; rubber particles travel and distribute in Copper tubes (or Titanium tubes) in same way as operating water flow, so, not all the pipes can be cleaned; sometime, rubber particles may congest in tube due to various reasons, make the pipe blocked; it is also difficult to recovery rubber particles, the rubber particle failed to be recycled, will increase the cost for cleaning operation and pollute the environment.

SUMMARY OF THE INVENTION

Due to the disadvantage for the currently applied technology, this invention will provide a technical solution for on-line automatic, completely and efficient flushing and cleaning of steam turbine generator set in normal operation status.

To solve out the above mentioned technical concerns, on-line automatic flushing and cleaning apparatus and method for steam turbine generator is provided in this invention, which includes:

A polar coordinate mechanical traveling system, to control and move a high pressure water jet to sweep off whole surface for each Copper tube (or Titanium tube), said polar coordinate traveling system comprises a Computer Program Polar Coordinate control unit, a rotating angle control motors and a related transmission structure and rotating support beam, a radial movement control motor, and a related transmission structure and a extension supporting beam. The said angle movement motors drives the rotating support beam through a transmission shaft, the radius movement control motor drive an extension supporting beam through said transmission shaft; the rotating beam can rotate along the rotating axle, and said extension supporting beam can move along the radius directions of rotating supporting beam. On the end of the extension supporting beam, there is the high pressure water jet; Said Computer program polar coordinate control unit can converse the rectangular coordinate position (x, y) of Copper tube (or Titanium tube) on tube plate into polar coordinate position (R, F), then the said computer program polar coordinate control unit will control both said angle moving motor and said radial moving motor, to move the high pressure water jet to the open for Copper tube (or Titanium tube), to perform flushing and cleaning; Said computer program polar coordinate control unit will transfer rectangle coordinate position for one copper (or Titanium tube) opening into polar coordinate (R, F), then the angle parameter will be used to position the rotating beams through angle moving control motor via the transmission structure, while the radius parameter will be used to position the extension beam via the transmission structure, then the water jet on extension beam will perform cleaning operation, then, repeat the above procedure for positioning and flushing/cleaning. In such way, Copper tubes (or Titanium tubes) on condenser tube plate can be flushed and cleaned one by one.

To solve the above technical problem, a method for on-line automatic flushing and cleaning for steam turbine generator re-condenser described in this invention can be used, it comprises following procedures:

Position (X, Y) for Copper tube (or Titanium tube) in rectangle coordinate be transferred to polar coordinate (R, F) by Computer program polar coordination control unit;

The angle and radius parameters in polar coordinate will be dispatched to compatible Programmable Logic Controller (PLC);

With PLC, said polar coordinate parameters will be used to control the servo motors, which means, polar coordinate angle parameter to control the rotating motor, and driving shaft to position the angle of rotating support, beam, meanwhile, radius parameter to control the radial moving motor, and the extension beam is driven to position the radius of the beam, therefore, the high-pressure water jet can be located at the opens of the Copper tube (or Titanium tube);

Open the high pressure water jet located on the opening for Copper tube (or Titanium tube), the water jet will automatically move forward to contact closely the pipe opens, and perform the flushing and cleaning.

Repeat the above mentioned procedure for positioning, flushing and cleaning, one by one, the Copper tube (or Titanium tube) in condenser tube plate can be selected and cleaned. During the operation of turbine generator, the above mentioned procedure to be repeated continuously, therefore, the purpose to clean all the Copper tube (or Titanium tube) on condenser tube plate in efficient and complete way can be archived.

The on-line automatic flushing and cleaning apparatus for steam turbine generator in this invention, with polar coordinate mechanical traveling system to control the high-pressure water jet to reach each Copper tube (or Titanium tube), and perform flushing/cleaning, so as to keep the Copper tube (or Titanium tube) in condenser cleaned efficiently and completely, therefore, the high-pressure water flushing during generator operation can be archived, and increase the heat exchange efficient in condenser, further to reduce the unit fuel consumption or unit coal consumption for steam turbine generator, and reduce the cost for power generating; beside the above, with polar coordinate mechanical traveling system, the apparatus can work in stable condition even with turbulence flow in water pass of condenser, this is the key technology for the on-line automatic flushing/cleaning apparatus in condenser.

DETAILED DESCRIPTION OF THE INVENTION

More detailed description for this invention will be present with the attached drawings, while this implement doesn't limit the implement scope of the invention, any similar configuration or modification, shall be within the protection for the invention.

Figure 1:
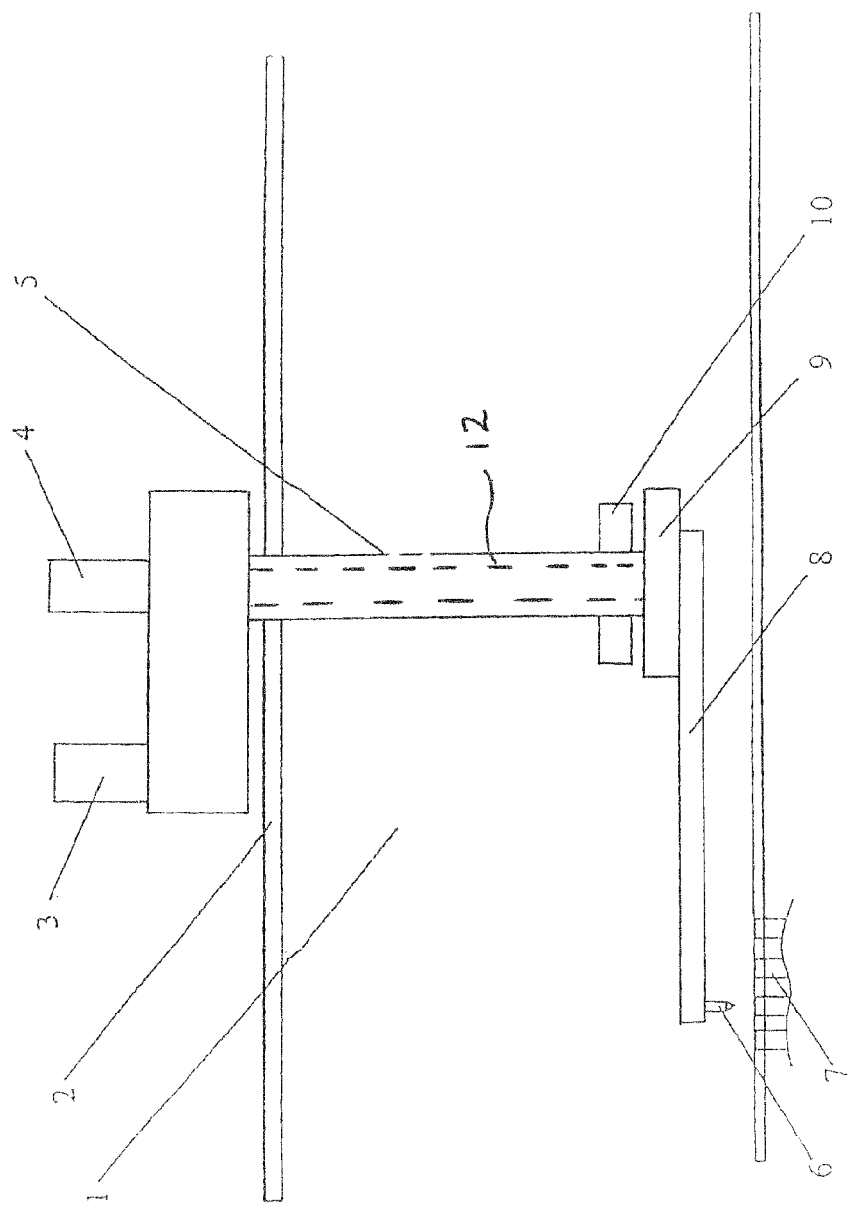
FIG. 1. Implement Example for the invention, configuration for on-line automatic flushing/cleaning apparatus for condenser.
Figure 2:
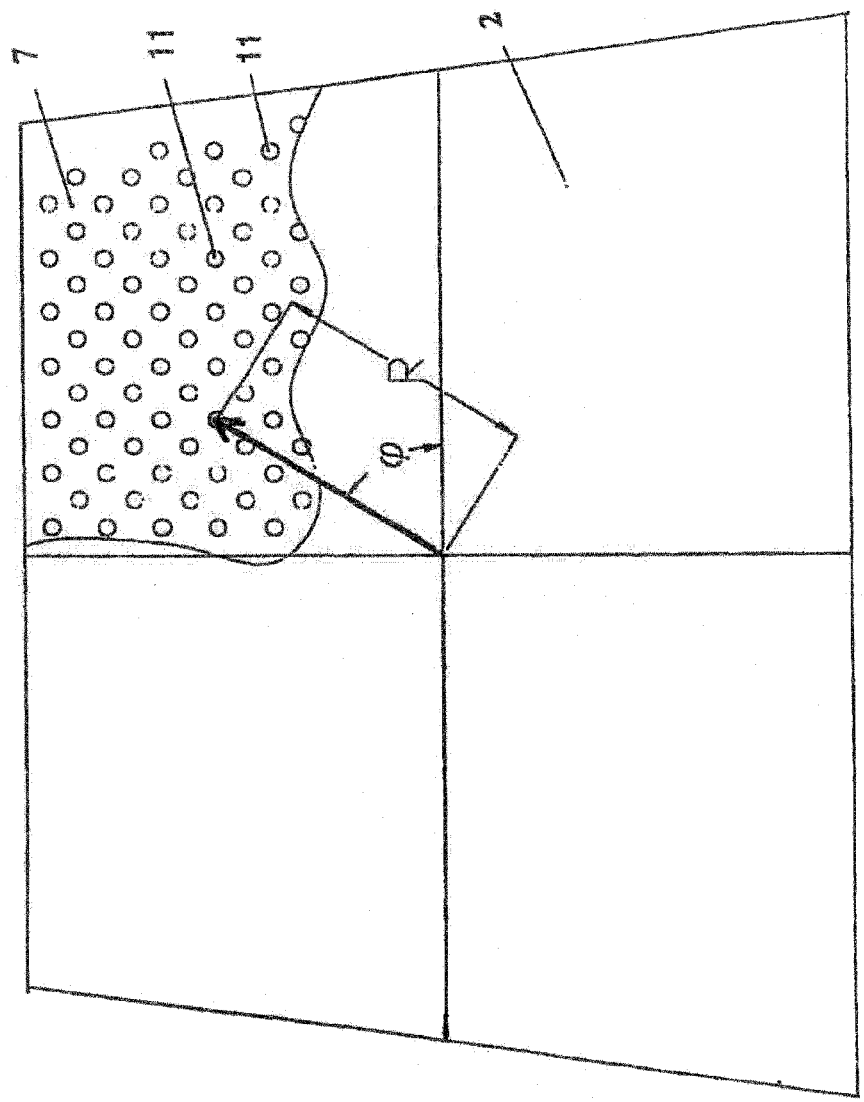
FIG. 2. Implement example for the invention, sketch for coordinates transferring on the surface of tube plate in condenser.

Referring to FIGS. 1 and 2, in the embodiment, the provided on-line automatic flushing/cleaning apparatus for a steam turbine generator condenser, comprises a high-pressure water jet 6; a polar coordinate traveling mechanical system to control and move a high-pressure water jet 6 across all Copper tubes (or Titanium tube) on a condenser tube plate 7.

The said polar coordinate traveling mechanical system comprises a computer program polar coordinate control unit (not shown in the Figures), an angle control motor 3, a related transmission structure and a rotating supporting beam 9, a radius moving control motor 4 and a related transmission structure and an extension supporting beam 8. The angle control motor 3 drives the rotating supporting beam 9 through a rotating transmission shaft. The radius moving control motor 4 drives the extension beam 8 through an extension transmission shaft.

The computer program polar coordinate control unit has a computer and programmable logic controller (PLC).

The above mentioned angle rotating control motor 3 and radius moving control motor 4 can be servo motors.

Said rotating drive shaft and extension driving shaft are sleeves 5, the outside is rotating driving shaft, and the inside is extension shaft 12. The connection between rotating shaft and extension shaft can be either bushing ring or bearings.

One end of the sleeve 5 is supported by the condenser plate 2, the other end is supported by an intermediate bearing 10 connected with the condenser shell (or wall). Usually, the axle for the sleeve spindle 5 is in the middle of Copper tube (or Titanium tube) bundle, therefore, the length for the extension supporting beam 8 can be minimized.

The angle moving control motor 3 can drive the rotating transmission shaft to rotate along an axle direction through a transmission structure; such transmission structure can be either a gear transmission structure or a synchronism transmission structure or any other transmission structure.

The radius moving control motor 4 connects with the extension driving shaft and moves the shaft along a radius direction.

The angle rotating control motor 3 and the transmission structure can be mounted on the condenser plate 2 with help of a fixture.

On the other end of rotating driving shaft outside the sleeve 5 there is a rotating support beam 9, rotating together with rotating driving shaft.

Inside the sleeve 5, on the other end of the extension driving shaft, there is a transmission structure to drive extension beam 8 moving along the rotation support beam 9. The extension support beam 8 is in form of inner-external sleeve(s), the inner sleeves is driven by radius moving control motor 4, and the external is driven by the angle rotating control motor 3. The transmission structure for support beam can be a gear and rack structure; the gear can be installed on the extension driving shaft, while the rack shall be installed on the inner sleeve pipe on the extension support beam 8. Besides the above, other transmission structure that can transfer the rotating movement to straight line movement can also be used.

The connection between inner pipe and external pipe can be of a sliding track, or sliding block and slot.

On the top of the extension support beam 8, there is a high-pressure water jet 6.

The angle rotating control motor 3 drives the rotating transmission shaft with the transmission structure, and the rotating transmission shaft drives the rotating support beam 9 to rotate. With the extension support beam 8, the high-pressure water jet 6 on the its inner sleeve pipe can be positioned in a right/desired angle for opening of each Copper tube (or Titanium tube) on surface of tube plate 7 in the condenser.

The radial moving control motor 4 drives the extension driving shaft and a transmission structure drives the inner sleeve pipe of extension support beam 8, to move along the radius direction for rotating support beam 9, then the high-pressure water jet 6 on extension support beam 8 can be positioned in a right/desired radius for openings of each Copper tube (or Titanium tube) on surface of tube plate 7 in the condenser.

During automatic flushing/cleaning, the computer will calculate and transfer the rectangle coordinate position (X, Y) into polar coordinate position (R, f), and record the result as a regular program.

Programmable Logic Controller (PLC) will use this polar coordinate parameters to control both the angle rotating motor 3 and radius moving control motor 4, then the rotating support beam 9 and extension support beam 8 can be moved, which means the control on polar coordinate position angle f and radius R. After positioning, the high-pressure water jet 6 on top of the extension beam 8, can reach each Copper tube (or Titanium tube) on tube plate and clean the pipes one by one, all the Copper tubes (or Titanium tubes) on tube plate 7 can be reached, therefore, all the Copper tubes (or Titanium tubes) can be completely and efficiently cleaned. The heat exchanging efficient can be increased. With advantage of polar coordinate design principle, the apparatus is in compact and reasonable configuration, and stable in turbulence water flow, proved for long term stable operation. This is the key factor for the invention.

In addition, on the basis of said embodiment, the invention can have a lot of variations for the skill men in the art, but they are still be protected by the present invention.

The invention claimed is:
1. An on-line automatic flushing and cleaning apparatus for a condenser in a turbine generator comprising:
   a high speed water jet position in the condenser to reach each copper tube or titanium tube across a tube plate in the condenser;
   a longitudinal moveable extension support beam positioned in the condenser, the water jet mounted at one end of the support beam;

a rotatable movable rotating support beam positioned in the condenser and mounted at the other end of the extension support beam, the extension support beam longitudinally movable from the rotating support beam;

a computer programmed polar coordinating unit, positioned outside the condenser, that converts a rectangular coordinate position (x, y) of each tube of the tube plate of the condenser in the turbine generator into a polar coordinate position (R, f) and outputs a control signal in polar coordinates;

an angle rotating control motor, positioned outside the condenser, that receives the control signal from the coordinating unit in polar coordinates and rotates the rotating support beam based on the polar coordinates by means of a related transmission and an rotating driving shaft which is connected at one end of the angle rotating control motor and at the other end to the rotating support beam;

a radius moving control motor positioned outside the condenser, that receives the control signal from the coordinating unit in polar coordinates, and longitudinally moves, in a radial direction, the extension support beam by means of a related transmission and an extension driving shaft which is connected at one end to the radius moving control motor and at the other end to the extension support beam such that the water jet moves directly from polar coordinates calculated for each tube by the coordinating unit and the apparatus works in turbulent water flow conditions so that the flushing and cleaning occurs while the condenser is on-line.

2. The apparatus of claim 1, wherein said computer program polar coordinate control unit is combined with a computer and a programmable logic controller (PLC).

3. The apparatus of claim 1, wherein said angle rotating control motor and radius moving control motor are of servo motors.

4. The apparatus of claim 1, wherein said rotating driving shaft and extension driving shaft form a sleeve with an external shaft and an inner shaft, in which the external shaft is the rotating driving shaft, and the inner shaft is the extension driving shaft.

5. The apparatus of claim 4, wherein said rotating driving shaft and extension driving shaft are connected with bearings.

6. The apparatus of claim 4, wherein one end of said sleeve goes through a condenser plate and is mounted on the condenser plate; another end of said sleeve is supported by a condenser shell with an intermediate bearing support.

7. The apparatus of claim 4, wherein on the other end of the said extension driving shaft, there is a transmission structure to drive the extension supporting beam to move in a radius direction of said rotating support beam.

8. The apparatus of claim 7, wherein said transmission structure at the other end of the extension driving shaft is of a gear and rack structure, the gear is installed on the extension driving shaft, and the rack is installed on an inner sleeve on the extension supporting beam, the connection between said inner sleeve and an external sleeve can be a sliding track, or a sliding block and channel.

9. The apparatus of claim 8, wherein the related transmission of said angle rotating control motor is a rotating transmission shaft with a transmission structure, and the rotating transmission shaft drives the rotating support beam to rotate for positioning of an angle, with the extension support beam, the high-pressure water jet on the inner sleeve can be positioned in a right angle for openings of each copper tube or titanium tube on a surface of the tube plate in the condenser.

10. The apparatus of claim 1, wherein the said angle rotating control motor and related transmission structure, the radial moving control motor and related transmission structure are mounted on the condenser plate by a fixing mean.

11. The apparatus of claim 1, wherein said radius moving control motor drives the extension transmission shaft with a transmission structure and the extension transmission shaft drives the extension support beam to move along the radius direction of the rotating support beam for positioning a desired radius, then the high-pressure water jet on the extension support beam can be positioned in a right radius for openings of each copper tube or titanium tube on the surface of the tube plate in condenser.

12. A method to perform on-line flushing and cleaning of steam turbine generator condenser, comprising the steps of:

calculating and transferring a rectangle coordinate position (X, Y) into a polar coordinate position (R,f) by a computer program polar coordinate control unit located outside the condenser;

dispatching polar coordination parameters including an angle positioning parameter and a radius parameter to compatible programmable logic controller (PLC);

controlling a servo motor directly by said PLC using said polar coordination parameters, in which, the angle position parameter is used to position an angle through an angle moving control motor located outside the condenser for driving a rotating support beam, while the radius parameter is used to position a radius by a radius moving control motor located outside the condenser driving an extension support beam; then locating a high-pressure water jet inside the condenser on an end of an extension support beam to an opening of a copper tube or titanium tube at said radius and angle;

turning on the high pressure water jet so that the water jet can automatically move forward to contact closely with the opening to perform the flushing and cleaning; and repeating above steps one by one so that other copper tube or titanium tube in the condenser can be selected and cleaned.

* * * * *